(12) United States Patent
Stango, Jr. et al.

(10) Patent No.: US 8,931,743 B2
(45) Date of Patent: Jan. 13, 2015

(54) APPARATUS FOR RETAINING WIRES AND CORDS

(71) Applicants: Timothy R. Stango, Jr., Sandy Hook, CT (US); John Paul Girgenti, New Milford, CT (US)

(72) Inventors: Timothy R. Stango, Jr., Sandy Hook, CT (US); John Paul Girgenti, New Milford, CT (US)

( * ) Notice: Subject to any disclaimer, the term of this patent is extended or adjusted under 35 U.S.C. 154(b) by 0 days.

(21) Appl. No.: 13/680,578

(22) Filed: Nov. 19, 2012

(65) Prior Publication Data

US 2014/0138498 A1    May 22, 2014

(51) Int. Cl.
*F16L 3/08* (2006.01)
*H02G 3/32* (2006.01)

(52) U.S. Cl.
CPC ..................................... *H02G 3/32* (2013.01)
USPC ........................................ 248/74.1; 248/74.2

(58) Field of Classification Search
USPC ........ 248/74.1, 74.2, 229.15, 229.13, 229.23, 248/229.25; 24/115 M, 134 L
See application file for complete search history.

(56) References Cited

U.S. PATENT DOCUMENTS

| | | | | |
|---|---|---|---|---|
| 2,423,660 A | * | 7/1947 | Reynolds | 439/477 |
| 2,536,448 A | * | 1/1951 | Klar | 132/276 |
| 2,665,466 A | * | 1/1954 | Morgan | 24/565 |
| 3,224,303 A | * | 12/1965 | Giroux | 81/343 |
| 3,521,332 A | * | 7/1970 | Kramer | 403/188 |
| 3,553,999 A | * | 1/1971 | Rommel | 72/324 |
| 4,707,906 A | * | 11/1987 | Posey | 29/453 |
| 6,328,459 B1 | * | 12/2001 | Adams | 362/396 |
| 7,607,618 B2 | | 10/2009 | Mori et al. | |

OTHER PUBLICATIONS

CableOrganizer.com, "3M Innovation Cord Clips with Command Adhesive", Parts 17017, 17302, 17303, 17379 (accessible at http://cableorganizer.com/cord-clips/ on or before Feb. 13, 2012).
CableOrganizer.com, "Keep-a-Cable Cord Anchor" (accessible at http://cableorganizer.com/keep-a-cable/, on or before Feb. 13, 2012).
CableOrganizer.com, "Self-Adjusting Computer Cable Organizer" (accessible at http://cableorganizer.com/keep-a-cable/, on or before Feb. 13, 2012).
BlueLounge.com, "CableDrop: Multi-purpose Cable Clips" (accessible at http://www.bluelounge.com/products/cabledrop/, on or before Feb. 13, 2012).

(Continued)

*Primary Examiner* — Alfred J Wujciak

(57) ABSTRACT

The present invention relates to an apparatus and a system for retaining wires or cords, such as those associated with electronic devices An apparatus is provided comprising a first channel configured to clamp a wire in a position within the first channel when the wire is inserted through the first channel, and a second channel adjacent to the first channel and comprising a larger clearance area than the first channel configured to allow the wire to pass through the second channel when the wire is inserted through the second channel. The first channel is formed between a first surface and an opposing second surface, wherein at least one of the two surfaces is movable relative to the other to grip a wire within the first channel.

15 Claims, 12 Drawing Sheets

(56) References Cited

OTHER PUBLICATIONS

Heyco.com, HEYClip Tension Wire Clips (accessible at http://www.heyco.com/Nylon_PVC_Hardware/product.cfm?product=Tension-Wire-Clips&section=Nylon_PVC_Hardware, on or before Feb. 13, 2012).

Richco.com, "SWC—Single Wire Clip, Adhesive Mnt" (accessible at http://www.richco-inc.com/products/cable-management/105-cable-management-catalog.html?PartNum=&country=RICHCOUSA&grpcode=H1920, on or before Nov. 26, 2012).

* cited by examiner

SECTION B-B

APPARATUS FOR RETAINING WIRES AND CORDS

FIELD OF INVENTION

The present invention relates generally to apparatuses for wire or cable retention. More particularly, the present invention relates to an apparatus providing a plurality of channels for retaining or clamping a wire.

BACKGROUND OF THE INVENTION

The present invention is directed toward an apparatus for retaining wires or cables.

Many rechargeable battery-operated devices, such as a mobile device, come with an alternating current (AC) charger that in many instances remains plugged into the same wall outlet on a daily basis, and quite often is placed on a piece of furniture, such as a table, night stand or desk, while charging. This wire or cord, terminated on one end by a connector configured to engage the mobile device, can often fall out of reach behind the piece of furniture when not in use, resulting in inconvenience for the user.

Products currently available that can assist in retaining a wire have various shortcomings. A wire tie with an adhesive-backed mounting base can be used to anchor a wire to a flat surface. However, such wire ties are limited in the number of times they can be used, and often can only be used once. This does not work well for a mobile device charger which needs to be removed from one outlet and used in a different location. Alternative products available for routing cables are large and cumbersome, and often require a table top surface for mounting such that they cannot be mounted elsewhere, such as a side surface of a table or a wall. These alternative products also do not allow for maintaining one or more wires or cords in an organized fashion when their movement is not restrained and alternating into and out of such a restrained position in an easy manner.

A need exists for a wire retaining product that is compact, can be easily and discretely mounted, and has the dual functionality of allowing retention or capture of the wire in one mode and allowing movement of the wire in another mode.

SUMMARY OF THE INVENTION

A system and apparatus are provided for retaining wires, cables and cords to a surface, such as a surface of a piece of furniture. The apparatus may include of a narrow channel with a sprung clamp area for fixing a wire in a stationary position, and an annular area of larger clearance for retaining a wire, yet allowing the wire to move freely along its length but not allow enough clearance for the terminated ends of the wire to pass through the apparatus. The apparatus has two retaining areas formed by the narrow channel and the annular area, each capable of a different function of wire retention, and the apparatus can be attached to a surface. Adjacent to the retaining areas of the apparatus is an integrated base or large flat surface of the apparatus, which in some embodiments may include an adhesive layer that is covered by a protective film for attaching the apparatus to a surface.

The present invention provides an apparatus for retaining a wire and can perform two separate functions in one compact apparatus. The user can clamp a wire in a fixed position anywhere along its length. Additionally, the wire can be shifted to an unclamped position within the apparatus so that the wire or cord is free to move while still being retained to the apparatus which is attached to a piece of furniture or surface.

An example in which both functions can be used is an auxiliary audio cable which needs to be readily accessible. When not in use, this cable can be stored out of view behind a piece of furniture. When in use, the cable can be plugged into a portable device and the cable can be shifted to the clamped position to allow an adequate length of cable to sit on the table top along with the device to which the cable is attached.

According to a first aspect of the invention, an apparatus is provided comprising two channels. The first channel is formed between a first surface and a second surface opposing the first surface, wherein at least either the first surface or the second surface is configured to be movable towards the opposing surface to grip a wire when the wire is positioned between the first and second surfaces. The second channel is adjacent to and comprising a larger clearance area than the first channel. The second channel is configured to allow the wire to move freely and remain captivated within the second channel when the wire is positioned in the second channel. The first channel and the second channel are each configured to allow the wire to enter or exit the respective channel when the wire is moved laterally, into or out of either channel. The channel configuration may be arranged as to provide the smaller channel first and the larger as the second or vice versa. The apparatus also comprises a base, which may be configured to be affixed to a supporting surface, such as a piece of furniture or a wall.

In a first embodiment of the apparatus, the apparatus includes an exterior shell and one or more interior components. In this first embodiment, the exterior shell comprises an arm extending from a body and the body comprises a cavity configured to receive the interior components. The interior component comprises a base, an actuating element and a spring positioned between the actuating element and the base of the interior component configured to bias the actuating element away from the base of the interior component. The actuating element is contoured to form two retaining members which comprise the channel, and is opposed by an adjacent surface of the arm. The spring is configured to bias the actuating element towards the adjacent surface of the arm. At least one side of the first channel can be contoured to be opened by laterally moving an axially parallel wire or cable toward the center of the channel thereby depressing the actuating element away from the adjacent surface of the arm. The spring may be integrated into the interior component or be a separate component.

In a second embodiment of the apparatus, the apparatus consists of one piece, which comprises a base, a body adjacent to the base, and an arm extending from the body. The body and arm of the apparatus are at least partially separated by a slit, and the first channel and the second channel are contained in the slit. The arm comprises an extended portion configured to extend towards an adjacent surface of the body, and the extended portion comprises two retaining members. The first channel is configured to be opened by moving the arm away from the second section.

In a third embodiment of the apparatus, the apparatus comprises two channels. A first channel is formed between two opposing surfaces in which one or both surfaces are movable and/or spring loaded toward one another, as to grip the wire that is positioned between the two surfaces. A second, larger adjacent channel is formed by two fixed or movable opposing surfaces with a greater distance between the surfaces as to allow the wire positioned in the channel to move freely yet remain captivated within the second channel. At least one side of either channel may be contoured as to allow a wire moving laterally into the channel to pry the opposing surface apart allowing the wire to enter the channel. The channel configuration may be arranged as to provide the smaller channel next to an open end of the apparatus, and the larger channel next to a closed end of the apparatus, or vice versa. The apparatus also comprises a base, which may be configured to be affixed to a surface, such as a piece of furniture or a wall.

In a fourth embodiment of the apparatus, the apparatus comprises one piece comprising a base and two arms extending from the base. The two arms comprise an extended portion configured to bias towards each other, and each extended portion comprises two retaining members forming the first channel. At least one side of the first channel is configured to be opened by pulling one extended portion away from the opposing extended portion.

According to a second aspect of the invention, a system is provided comprising a wire comprising a terminating end connector, and an apparatus comprising: a first channel formed between a first surface and a second surface opposing the first surface, wherein at least one of the first surface and the second surface is configured to be movable towards the opposing surface to grip a wire when the wire is positioned between the first and second surfaces, and a second channel adjacent to and comprising a larger clearance area than the first channel, wherein the second channel is configured to allow the wire move freely and remain captivated within the second channel when the wire is positioned in the second channel.

BRIEF DESCRIPTION OF THE DRAWINGS

Figure 1A:
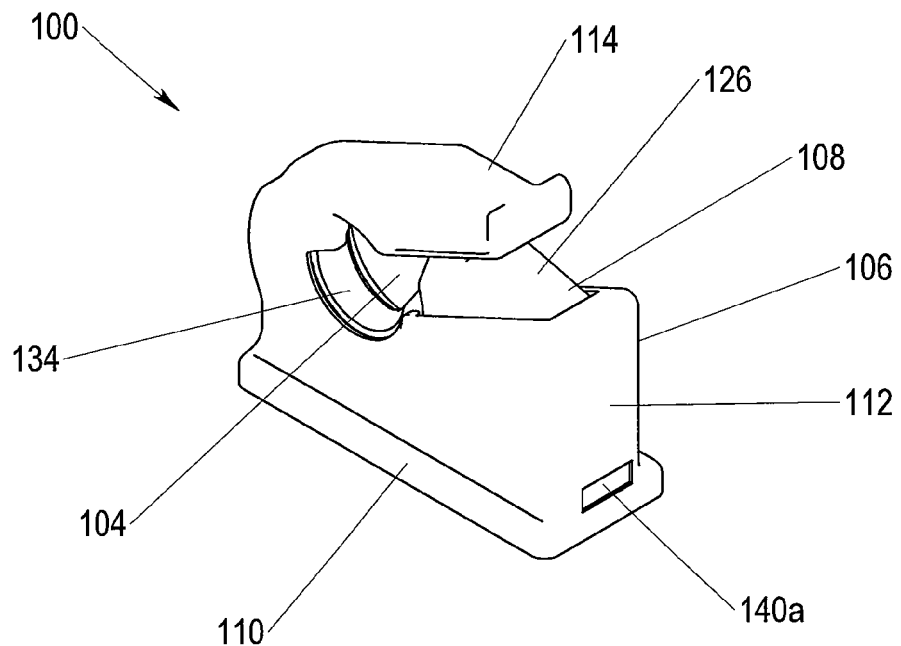
Figure 1B:
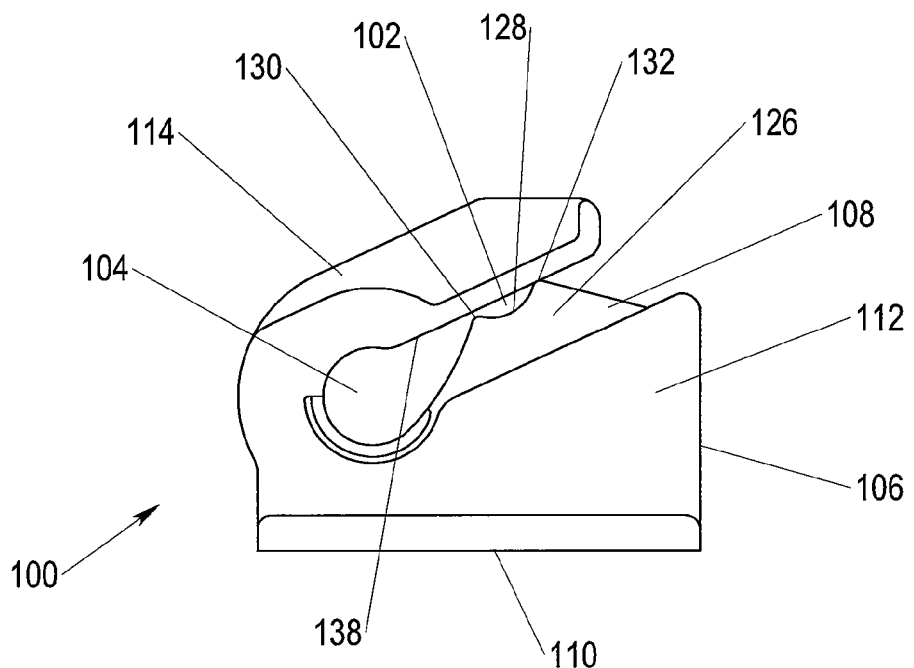
Figure 1C:
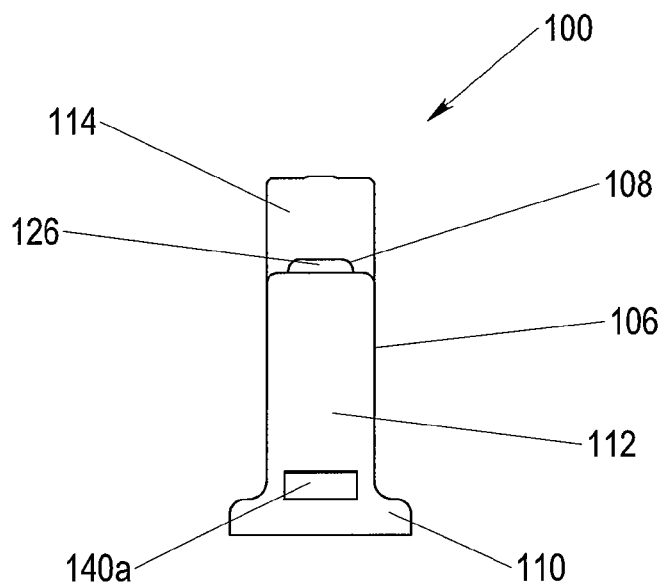
Figure 1D:
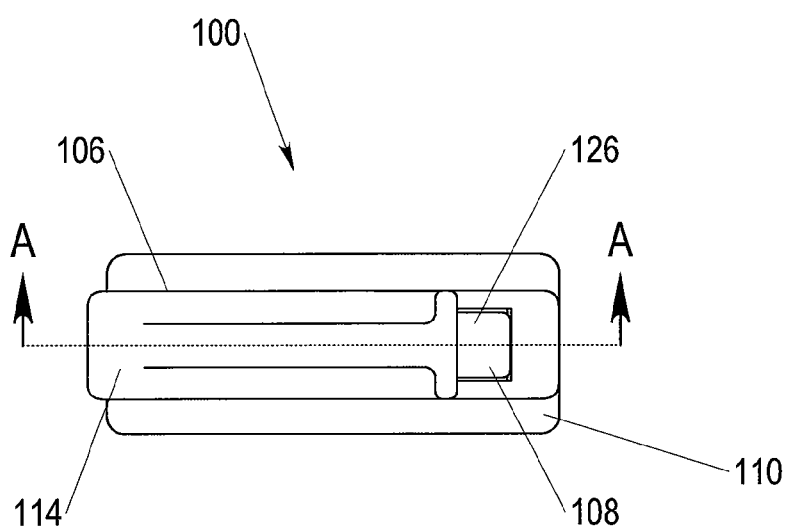
Figure 1E:
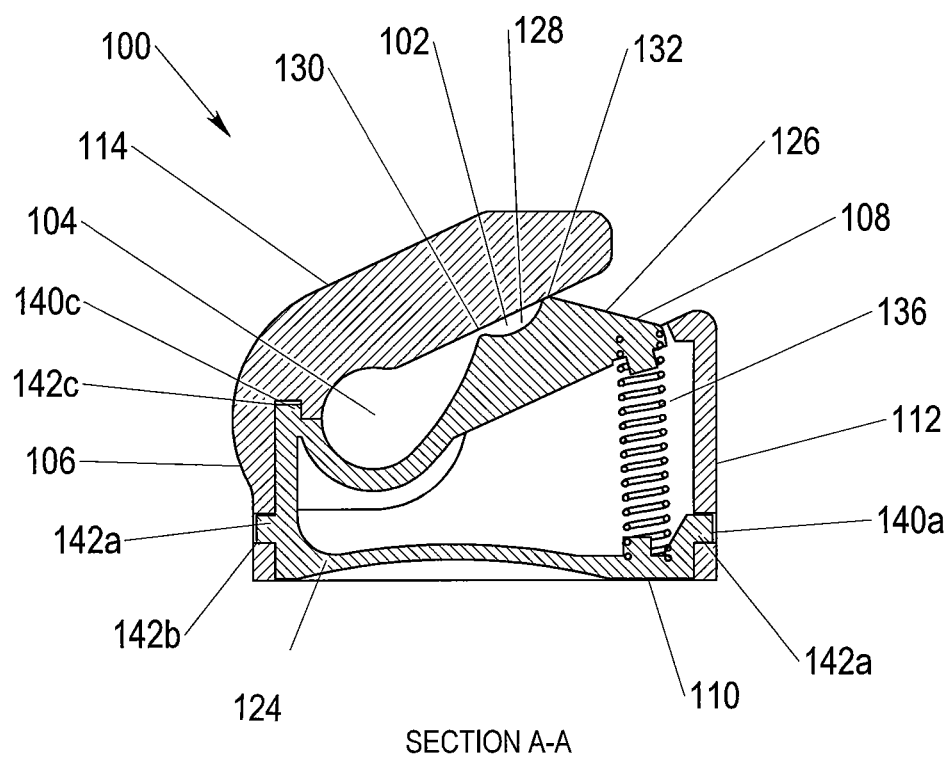
Figure 1F:
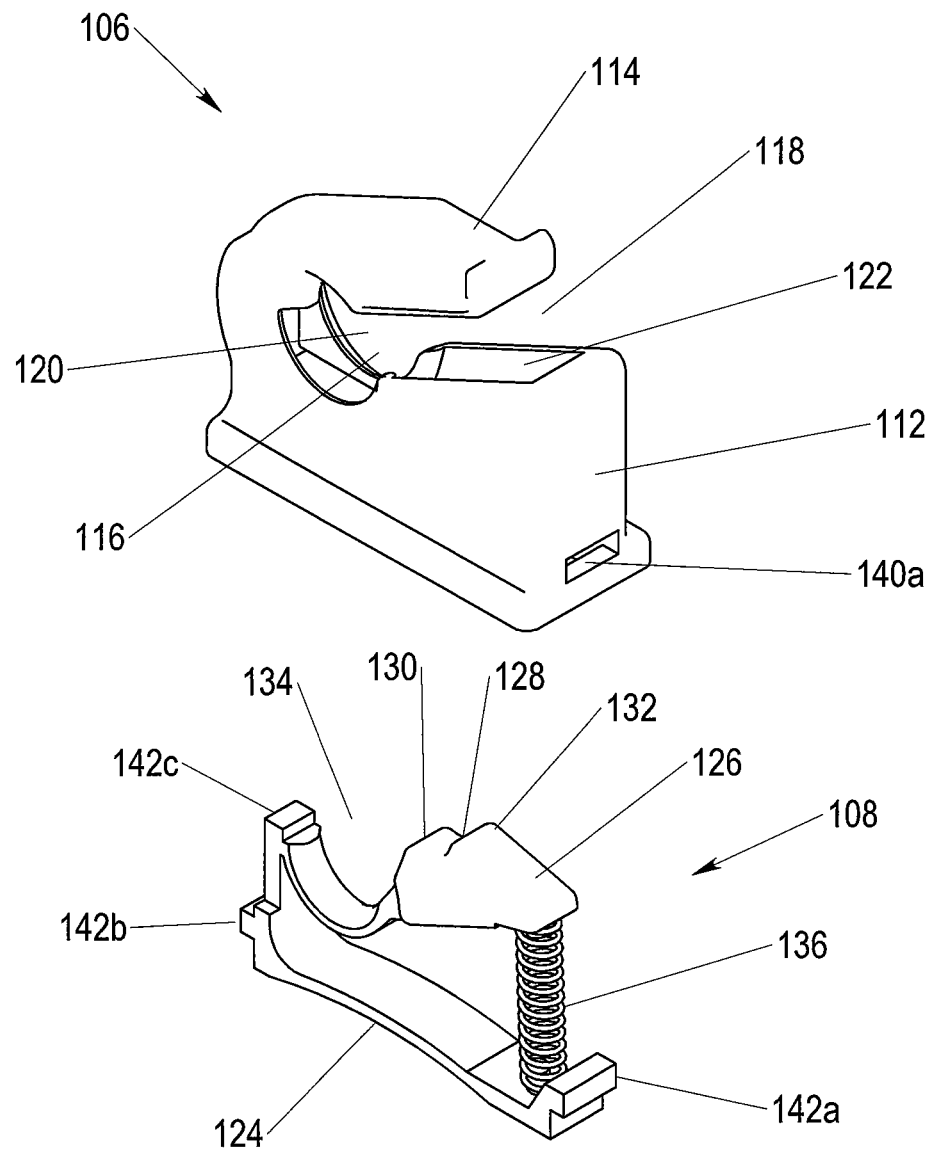
Figure 2A:
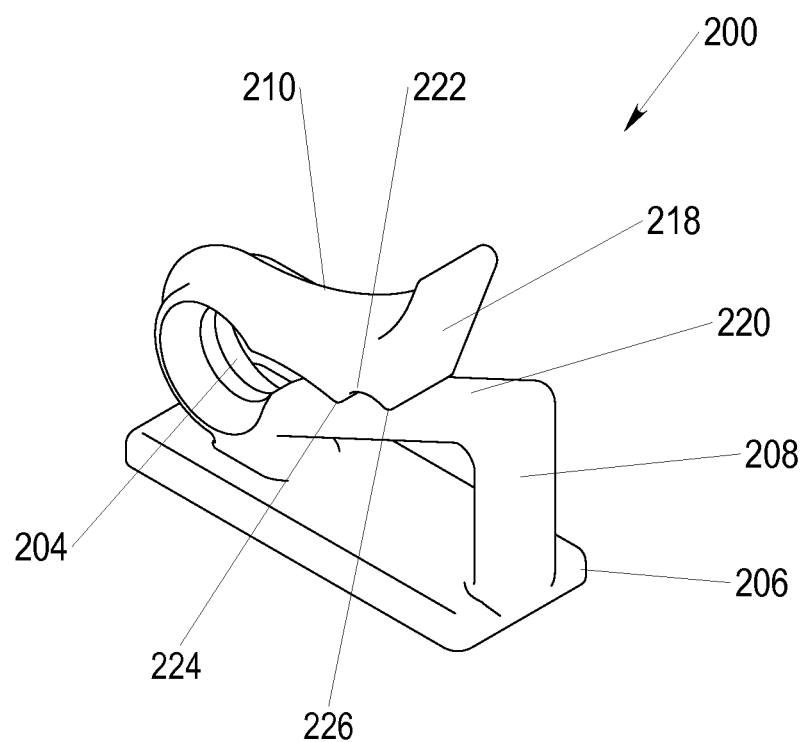
Figure 2B:
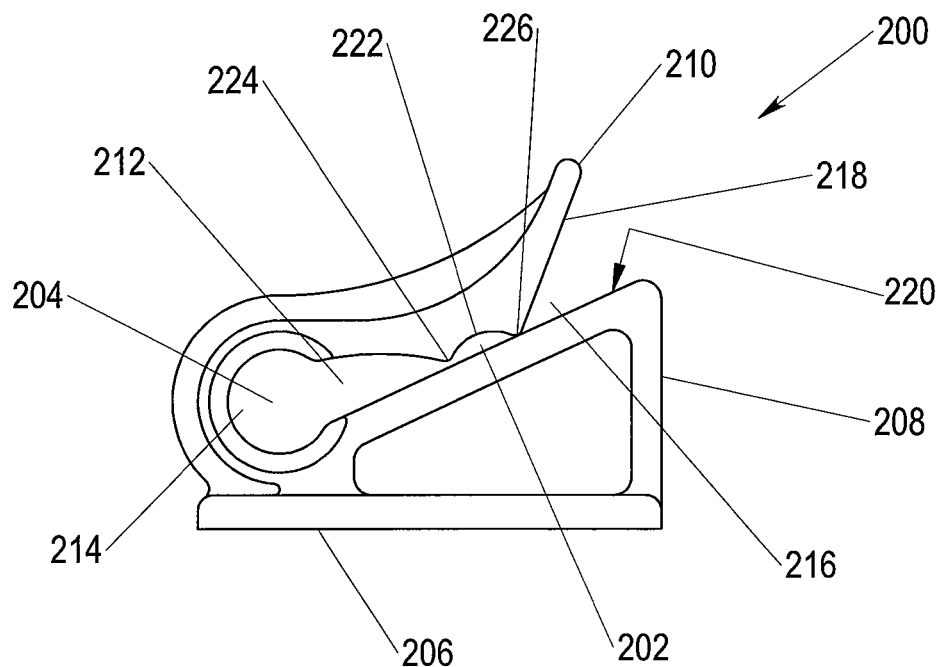
Figure 2C:
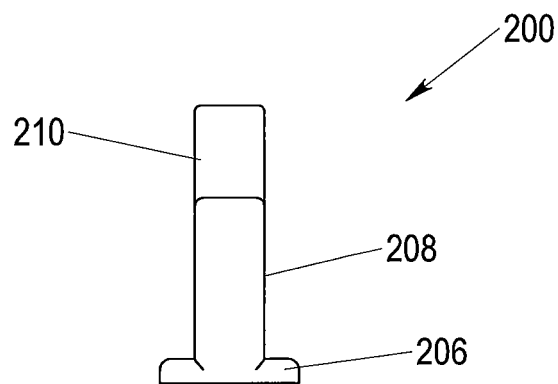
Figure 2D:
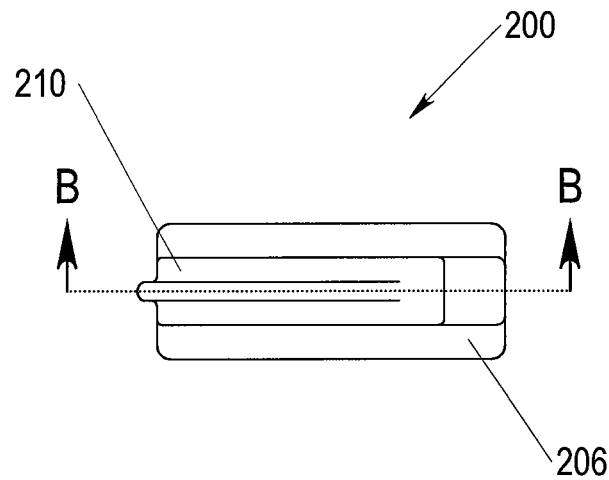
Figure 2E:
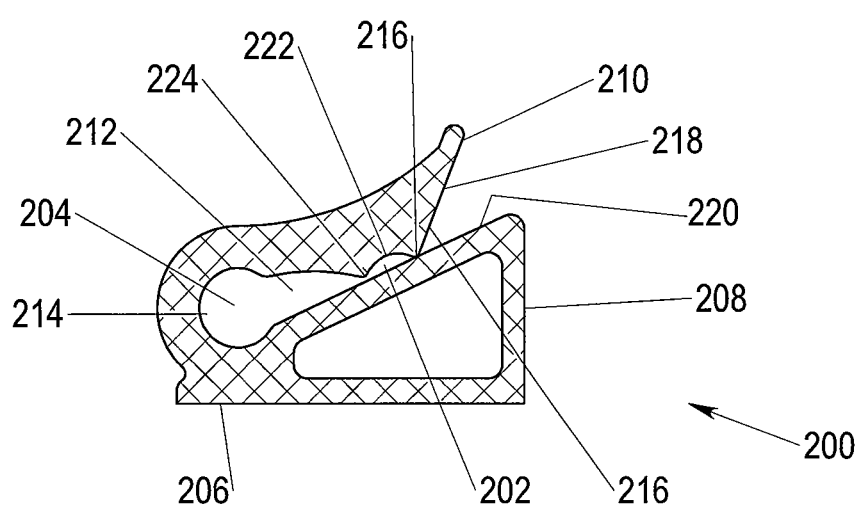
Figure 3:
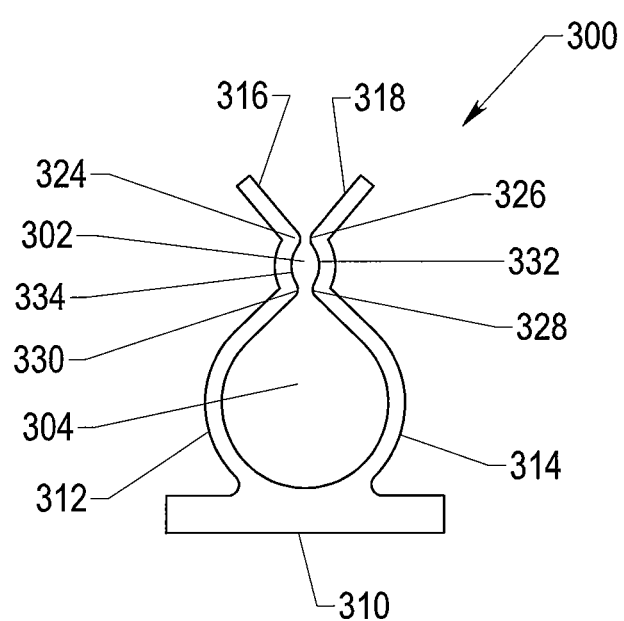
Figure 5A:
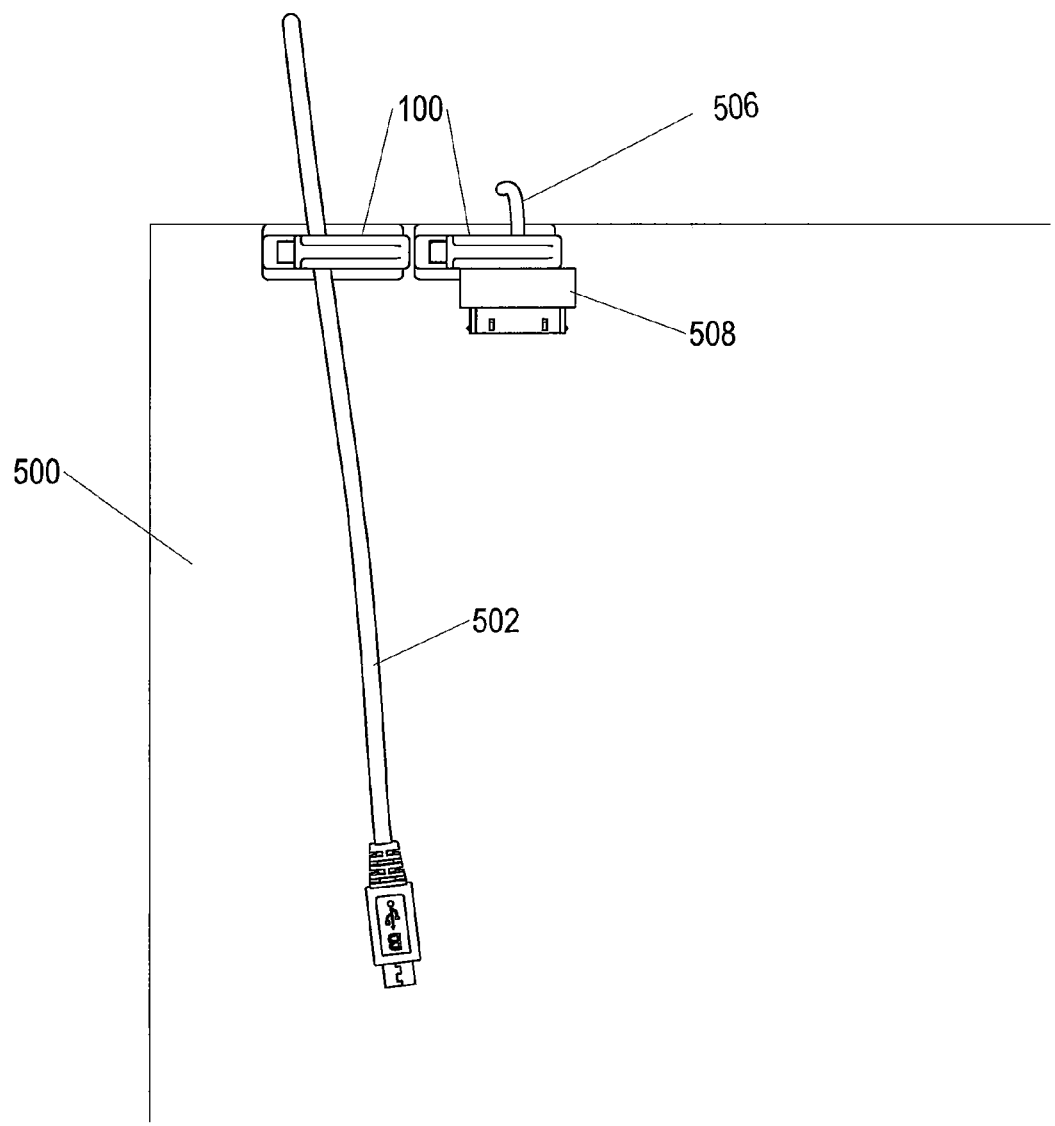
Figure 5B:
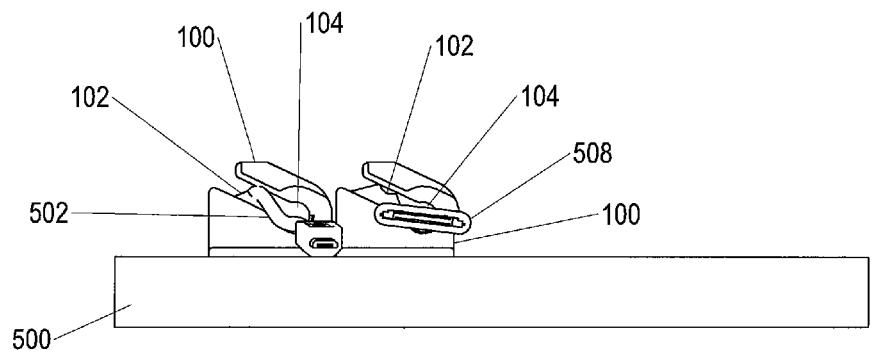
Figure 5C:
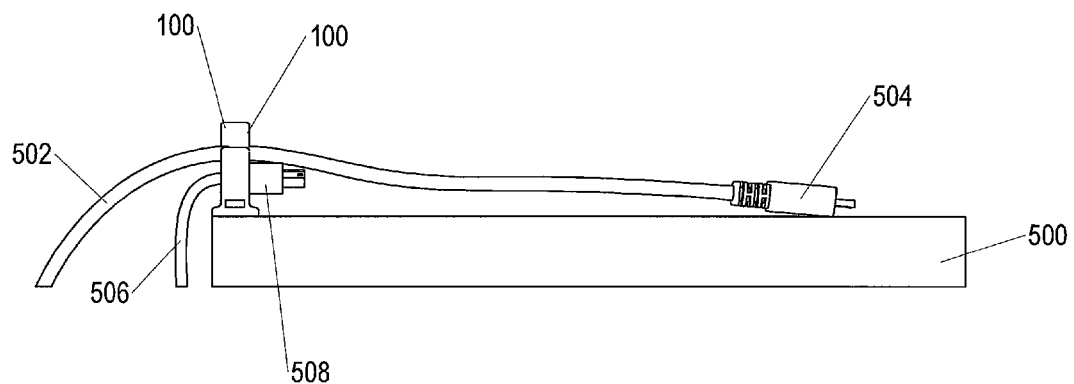

Having thus described the invention in general terms, reference will now be made to the accompanying drawings, which are not necessarily drawn to scale, where:

FIG. 1A shows a perspective view of an apparatus according to a first embodiment of the invention;

FIG. 1B shows a left side view of an apparatus according to a first embodiment of the invention;

FIG. 1C shows a front side view of an apparatus according to a first embodiment of the invention;

FIG. 1D shows a top plan view of an apparatus according to a first embodiment of the invention;

FIG. 1E shows a cross-section view along axis A-A, of an apparatus according to a first embodiment of the invention;

FIG. 1F shows an exploded view of an apparatus according to a first embodiment of the invention;

FIG. 2A shows a perspective view of an apparatus according to a second embodiment of the invention;

FIG. 2B shows a left side view of an apparatus according to a second embodiment of the invention;

FIG. 2C shows a front side view of an apparatus according to a second embodiment of the invention;

FIG. 2D shows a top plan view of an apparatus according to a second embodiment of the invention;

FIG. 2E shows a cross-section view along axis B-B, of an apparatus according to a second embodiment of the invention;

FIG. 3 shows a perspective view of an apparatus according to a third embodiment of the invention FIGS. 4A, 4B, 4C and 4D show a system according to embodiments of the invention, comprising an apparatus and wires of differing sizes;

FIG. 5A shows a top plan view of a system according to an embodiment of the invention comprising apparatuses affixed to a surface and wires;

FIG. 5B shows a front side view of a system according to an embodiment of the invention comprising apparatuses affixed to a surface and wires;

FIG. 5C shows a left side view of a system according to an embodiment of the invention comprising apparatuses affixed to a surface and wires;

DETAILED DESCRIPTION OF THE DRAWINGS

The present invention now will be described more fully hereinafter with reference to the accompanying figures, in which exemplary embodiments of the invention are shown. The invention may, however, be embodied in many different forms and should not be construed as limited to the embodiments set forth herein.

It is to be understood that all of the present figures, and the accompanying narrative discussions of corresponding embodiments, do not purport to be completely rigorous treatments of the invention under consideration. It is to be understood that the above-described arrangements are only illustrative of the application of the principles of the present invention. Numerous modifications and alternative arrangements may be devised by those skilled in the art without departing from the scope of the present invention.

FIGS. 1A-1F show an apparatus, generally indicated by reference numeral 100, according to a first exemplary embodiment of the present invention. The apparatus 100 includes a first channel 102 and a second channel 104. The first channel 102 and second channel 104 run through the apparatus 100 adjacent to each other and both are open at their proximal and distal ends, so as to allow a wire to be inserted through each channel. The clearance area of the first channel 102 is less than the clearance area of the second channel 104, such that a wire may be clamped its position if in the first channel 102, but move through the second channel 104 along the length of the wire. The apparatus 100 may also include two separate parts, an exterior shell 106 and an interior component 108, as well as a base 110, which can be configured to removably affix the apparatus 100 to a supporting surface such as a piece of furniture, a wall, a night stand or a desk.

The base 110 may have a width and/or length greater than the width and/or length the rest of the apparatus 100, which creates a larger surface area of the base 110. The increased surface area of the base 110 increases the ability of the apparatus 100 to adhere to a surface. The base 110 of the apparatus 100 may include means for affixing the apparatus to a supporting surface. Preferably, the means for affixing the apparatus is removable from the supporting surface. The means for affixing may be an adhesive strip, a hook and loop fastener, a magnet, or any other similar means for securing the apparatus to a supporting surface. Preferably, the means for affixing will not cause damage to the supporting surface, however, the means for affixing may also include means such as screws. The means for affixing may be included as part of the apparatus 100 during manufacture, or be a feature that comes separate from the apparatus 100 and is added by a user, and can be replaceable. The present invention is not limited to a particular means for affixing the apparatus 100 to a surface, but can include any suitable means for affixing the apparatus 100 to a surface.

The exterior shell 106 of the apparatus 100 can be seen in FIG. 1F. The exterior shell 106 of the apparatus 100 includes a body 112 and an arm 114 extending from the body 112. The body 112 and arm 114 are separated by a slit 116 that extends partially between the body 112 and arm 114. The slit 116 has an open end 118 and a closed, annular end 120 positioned at the end of the slit 116 where the body 112 and arm 114 meet. The exterior shell 106 also includes a hollow cavity 122, which is configured to hold the interior component 108 substantially inside the exterior shell 106.

The interior component 108 of the apparatus 100 can be seen in FIG. 1F. The interior component 108 includes a base 124, which may be positioned within the hollow cavity 122 in the apparatus 100. Opposing the base 124, the interior component 108 includes an actuating element 126. On the surface of the actuating element 126, an indented slot 128 is formed between two retaining members 130 and 132, which forms the basis of the first channel 102. The interior component 108 further includes an enlarged slot 134 positioned adjacent to the actuating element 126, and preferably connected to the base 124 and to the actuating element 126. Positioned between the base 124 and actuating element 126 is a spring 136, which may be affixed to either or both of the base 124 and actuating element 126. The spring 136 is configured to bias the actuating element 126 away from the base 124.

In a preferred embodiment, the interior component 108 is positioned within the exterior shell 106 such that the actuating element 126 of the interior component 108 extends into the slit 116 at or near the open end 118 of the slit 116 so that the actuating element 126 is accessible to a user. The actuating element 126 is biased by the spring 136 towards an adjacent surface 138 of the arm 114. Specifically, the retaining members 130 and 132 approach or come into contact with the adjacent surface 138 of the arm 114 when a wire is not inserted through the first channel 102. A resulting void is formed between the indented slot 128 of the actuating element 126 and the adjacent surface 138. On one side of the first channel 102, retaining member 130 substantially closes the first channel 102 from the closed annular end 120 of the slit 116. On an opposing side of the first channel 102, retaining member 132 substantially closes the first channel 102 from the open end 118 of the slit 116.

The interior component 108 is further positioned within the cavity 122 such that the enlarged slot 134 is configured to substantially align with at least a portion of the closed annular end 120 of the slit 116 in the exterior shell 106. As previously stated, the actuating element 126 extends into the slit 116 and causes the closed annular end 120 of the slit 116 to be closed off from the open end 118 of the slit 116. As a result, the second channel 104 is formed at the closed annular end 120 of the slit 116 adjacent to and parallel with the first channel 102, wherein the second channel 104 is substantially annular and has a larger clearance area than that of the first channel 102.

When the actuating element 126 is depressed manually or by a user moving a wire from outside the apparatus 100 laterally toward the first channel 102, it causes the retaining members 130 and 132 in the actuating element 126 to move away from the adjacent surface 138 of the arm 114. By moving the retaining members 130 and 132 away from the arm 114, allowing a wire to be inserted into or out of the first channel 102. Further lateral movement of the wire from the first channel 102 towards the second channel 104 causes the second channel 104 to be opened on the side of the second channel 104 adjacent to the first channel 102, such that a wire can be inserted into the second channel 104 from the first channel 102. The wire can be moved from the second channel 104 to the first channel 102, and from the first channel 102 to outside the apparatus 100 by the same operation in the opposite lateral direction. As a result, a wire can be moved laterally from the first channel 102 to the second channel 104, or vice versa, without requiring the user to entirely remove the wire from one channel and the apparatus 100, and reinsert the wire into the other channel. Releasing the actuating element 126 after a wire has been inserted into the first channel 102 clamps the wire or cord into the first channel 102, and recloses the open side of the second channel 104.

The apparatus 100 may also include means for securing the exterior and interior components 106 and 108 to each other to aid in the assembly of the apparatus 100. In one embodiment, the exterior shell 106 may include a plurality of receiving slots 140a, 140b and 140c, and the interior component may include a plurality of corresponding tabs 142a, 142b and 142c. The plurality of receiving slots 140a, 140b and 140c are configured to receive the plurality of tabs 142a, 142b and 142c, which further secures the interior component 108 in position within the exterior shell 106.

Although in the embodiment shown in FIGS. 1A-1F the apparatus 100 includes two components 102 and 104, the present invention is not limited to this embodiment. As shown in FIGS. 2A-2E, the present invention further provides for an apparatus 200, which is made substantially of one piece. The apparatus 200 includes a first channel 202 and second channel 204. Similar to the first and second channels 102 and 104 of the apparatus 100, the first and second channels 202 and 204 of the apparatus are positioned through the apparatus 200 parallel to each other. The clearance area of the first channel 202 is less than the clearance area of the second channel 204, such that a wire may be clamped in position if the wire is inserted through the first channel 202, but the wire may move through the second channel 204 along the length of the wire. The apparatus 200 may include a base 206 configured in a manner similar to the base 110 of apparatus 100, and configured to removably affix the apparatus 200 to a surface.

The apparatus 200 may include a body 208 adjacent to the base 206, and an arm 210 extending from the body 208. The body 208 and the arm 210 are partially separated by a slit 212, which has an open end 214 and an opposing closed annular end 216 where the body 208 and arm 210 meet. An extended portion 218 of the arm 210 extends into slit 212 and approaches or contacts an adjacent surface 220 of the body 208. The surface of extended portion 218 of the arm 210 adjacent to the body 208 includes a slot 222 formed between two retaining members 224 and 226 which forms the basis of the second channel 204. The retaining members 224 and 226 approach or come into contact with the adjacent surface 220 of the body 208. A resulting void is formed between the slot 222 of the arm 210 and the adjacent surface 220 of the body 208. On one side of the first channel 202, retaining member 224 substantially closes the first channel 202 from the closed annular end 216 of the slit 212. On an opposing side of the first channel 202, retaining member 226 substantially closes the first channel 202 from the open end 214 of the slit 212. As a result of the extended portion 218 extending into the slit 212, the closed annular end 216 of the slit 212 is closed off from the open end 214 of the slit 212. As a result, the second channel 204 is formed at the closed annular end 216 of the slit 212 adjacent to and parallel with the first channel 202, wherein the second channel 204 is substantially annular and has a larger clearance area that that of the first channel 202.

The arm 210 is configured to be biased towards the body 208 of the apparatus 200, but also to be movable away from the body 208. When a user moves an axially parallel wire or cable laterally toward the center of the channel 202, arm 210 lifts away from the body 208. Upon such lifting, the retaining members 224 and 226 of the extended portion 218 of the arm 210 move away from the adjacent surface 220 of the body 208. By moving the retaining members 224 and 226 away from the body 208, the first channel 202 is opened on two opposing sides, allowing a wire to be inserted into or out of the first channel 202 from either of the two sides. Movement of the arm 210 away from the body 208 further causes the second channel 204 to be opened on the side of the second channel 204 adjacent to the first channel 202, such that a wire can be inserted into or removed from the second channel 204 from this open side. As a result, a wire can be moved laterally from the first channel 202 to the second channel 204, or vice versa, without requiring the user to entirely remove the wire from one channel and the apparatus 200, and reinsert the wire into the other channel. After a wire has been inserted into the first channel 202 the biased arm 210 clamps the wire into the first channel 202 against the body 208, and recloses the open side of the second channel 204.

FIG. 3 shows an apparatus, generally indicated by reference numeral 300, according to a third embodiment of the present invention. The apparatus 300 includes a first channel 302 and a second channel 304. The first channel 302 and second channel 304 run through the apparatus 300 parallel to each other and both are open at their proximal and distal ends, so as to allow a wire to be inserted through each channel. The clearance area of the first channel 302 is less than the clearance area of the second channel 304, such that a wire may be clamped its position if in the first channel 302, but move through the second channel 304 along the length of the wire.

The base 310 may have a width and/or length greater than the width and/or length the rest of the apparatus 300, which creates a larger surface area of the base 310. The increased surface area of the base 310 increases the ability of the apparatus 300 to adhere to a surface. The base 310 of the apparatus 300 may include means for affixing the apparatus to a surface.

Two arms 312 and 314 extend from the base 310 and are configured to form the two channels 302 and 304. Arms 312 and 314 comprise ends 316 and 318, and adjacent to the ends 316 or 318, at least one of the two arms 312 and 314 comprise a slot 332 or 334 formed between retaining members 324 and 330 or 326 and 328. The two arms 312 and 314 comprise integrated spring elements which bias one arm towards the opposing arm.

The apparatus according to the present invention and its constituent components are not limited to one particular material for their manufacture. In a preferred embodiment, the apparatus and its components are made from an injection molded plastic and may include a plastic spring piece. However, the apparatus or spring may be made from any other suitable material, such as a metal.

The operation of the apparatus 100 according to the present invention in combination with a wire or cord is shown in FIGS. 4A-4D.

Figure 4A:
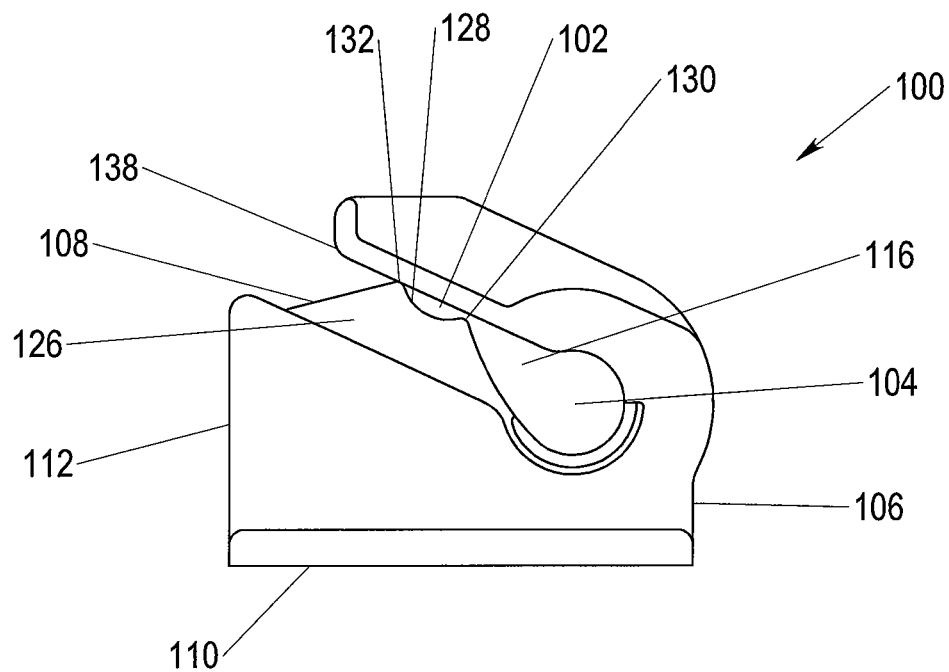
Figure 4B:
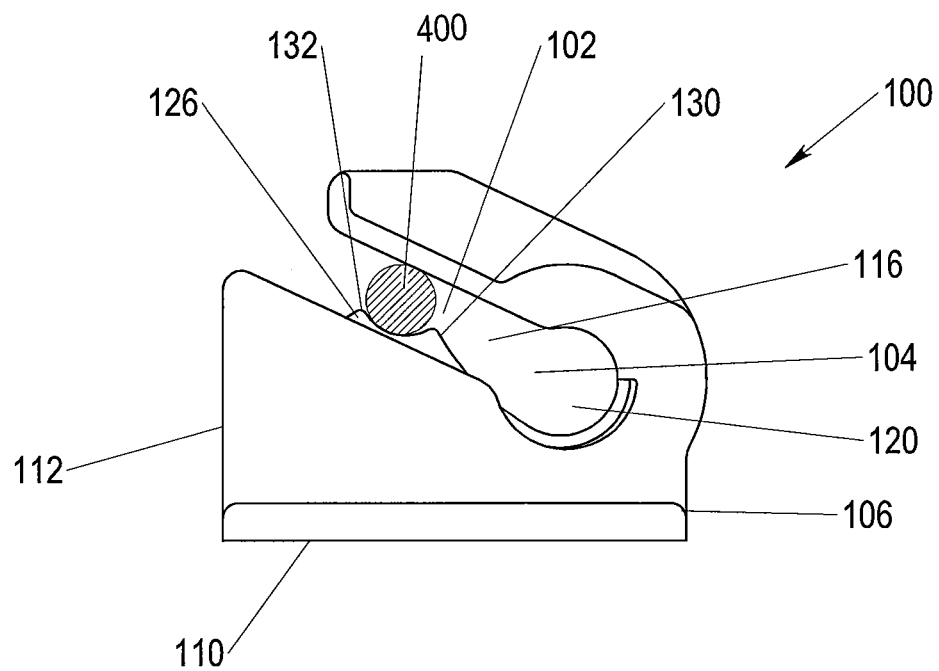
Figure 4C:
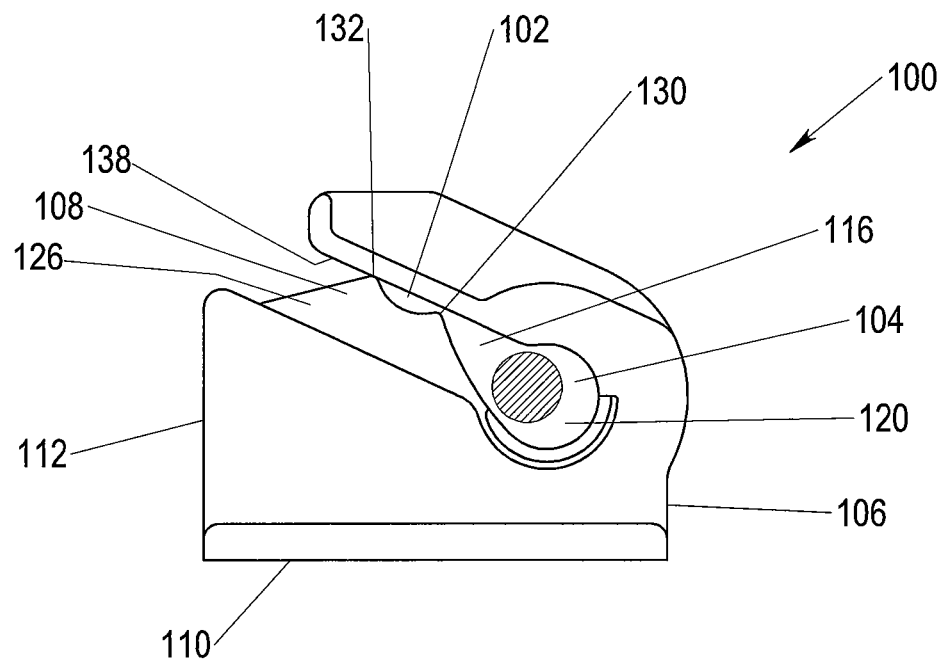

In FIG. 4A, the apparatus 100 is shown without any associated wire or cord inserted through either the first or second channels 102 and 104. A user seeking to clamp a wire 400 using the apparatus 100 in order to restrict movement of the wire 400 can insert the wire 400 into the first channel 102 at a desired point along the length of wire 400. In order to achieve this result, the actuating element 126 of the apparatus 100 can be depressed manually or by laterally moving the wire 400 into the indented slot 128 in the actuating element 126 of the apparatus 100. The spring 136 causes the actuating element 126 to be biased towards the adjacent surface 138 of the arm 114 clamping the wire 400 in place. As a result, as shown in FIG. 4B, the wire 400 is clamped in its current position in the indented slot 128, between the retaining members 130 and 132 of the actuating element 126 and the adjacent surface 138 of the arm 114 of the exterior shell 106. In this clamped state, movement of the wire 400 is restricted such that the wire 400 cannot slide out of or through the first channel 102.

The wire 400 can be released from the clamped state within the first channel 102 by moving the wire laterally towards the second channel 104 to open the sides of the first channel 102. By opening the sides of the first channel 102, an adjacent side of the second channel 104 is also opened such that the wire 400 can be moved directly from within the first channel 102 to within the second channel 104 without needing to entirely remove the wire 400 from the first channel 102 or the apparatus 100. Once the wire 400 is within the second channel 104, the spring 136 causes the actuating element 126 to be biased towards the adjacent surface 138 of the arm 114 thereby closing the open sides of the first channel 102 and second channel 104. Because the second channel 104 has a wider clearance area than the first channel 102 and does not utilize the clamping affect caused by the spring-aided actuating element 126, in the second channel 104, the wire 400 is in a retained state where the wire 400 may move through the second channel 104, even though the wire is still retained within the apparatus 100. In a preferred embodiment, the second channel 104 is configured such that the second channel 104 is large enough to allow a wire 400 to move through the second channel 104, but narrow enough to prevent a connector on a terminating end of the wire 400 from passing through.

Figure 4D:
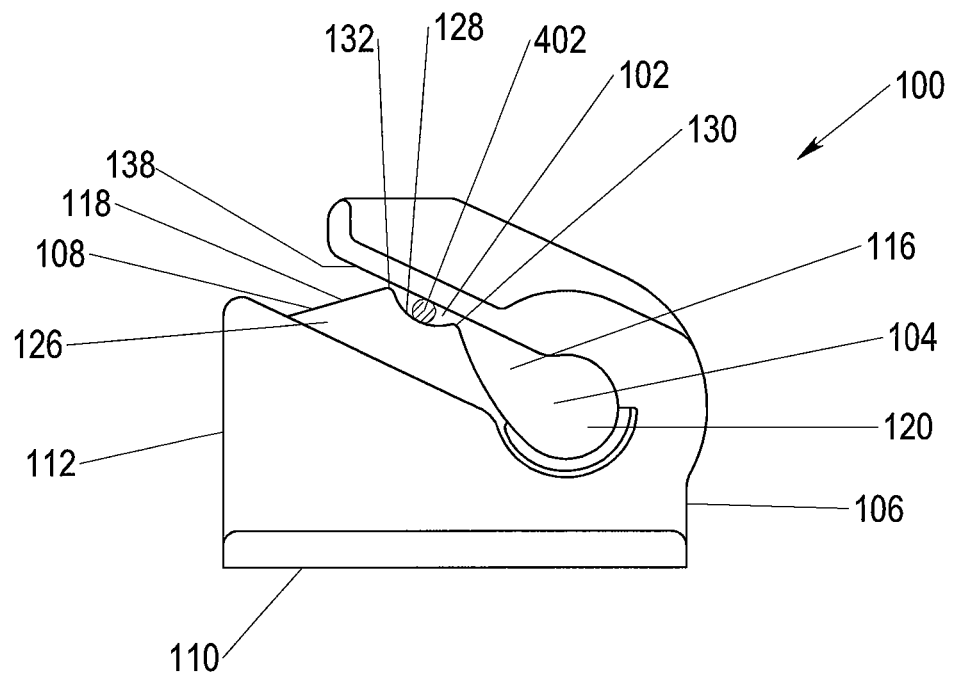

The present invention may be used in association with wires or cords of various sizes. For example, in the embodiments shown in FIGS. 4B and 4C, the wire 400 has a diameter of approximately 0.122 inches (4.8 millimeters). FIG. 4D shows the apparatus 100 of the present invention being used in conjunction with a smaller wire 402 with a diameter of approximately 0.06 inches (1.6 millimeters). The wire 402 is clamped within the first channel 102, but the first channel 102 is released to a narrower state when compared to the example shown in FIG. 4B with a larger wire 400. The apparatus is not limited to use with wires of a particular diameter or to any particular type of wire, cable or cord, but can be adapted for use with wires of any size type. Furthermore, the size of the apparatus 100 and channels 102 and 104 are not limited to one set or range of dimensions.

The apparatus 100 according to the invention may further be part of a system comprising a wire, and a supporting surface to which the apparatus may be affixed, as seen in FIGS. 5A-5C.

As stated above, the base 110 of the apparatus 100 may include means for affixing the apparatus to a supporting surface, for example, on a piece of furniture such as a night stand or a desk. The means for affixing can include an adhesive strip, a hook and loop fastener, a magnet, screws, or any other suitable means for removably or permanently affixing the apparatus 100 to a surface.

The apparatus 100 may be configured to allow one or more apparatuses 100 to be compactly positioned next to each other on a surface so that one or more wires may be maintained. Such a system is shown in FIGS. 5A-5C, where two apparatuses 100 are positioned adjacently on a supporting surface 500. The ability to position the apparatuses 100 compactly side-by-side is aided by the apparatus 100 having accessibility to its channel while not be obstructed by the body of an adjacent apparatus. In FIGS. 5A-5C, a first apparatus 100 is used in association with a first wire 502 having a terminating end connector 504, and a second apparatus 100 is used in association with a second wire 506 having a terminating end connector 508.

For purposes of illustrating one example of the system in FIGS. 5A-5C, the supporting surface 500 may be a desk, the wire 502 may come from a computer located beneath the supporting surface 500 and the wire 506 may come from an electrical outlet positioned behind the supporting surface 500. With respect to both wire 502 and wire 506, it would be inconvenient for a user if wire 502 or wire 506 were to fall behind or beneath the supporting surface 500, or if wire 502 and wire 506 must be tied down at one area on the supporting surface 500 such that they could not be extended to be inserted into their intended devices. By using each of wire 502 and wire 506 in conjunction with an apparatus 100, the user can switch between two functionalities. For example, the wire 502 is positioned within the first channel 102 of an apparatus 100 so that it is clamped into its current position and its movement is restricted. In contrast, the wire 506 is positioned within the second channel 104 of an apparatus 100 so that it can be extended or retracted through the second channel 104 to reach its target device or to be moved to the back the desk/surface 500 out of view. Either wire 502 or wire 506 can be moved from one channel to the other as described above, if the needs for either wire change. Furthermore, because the terminating end connector 504 of wire 502 and the terminating end connector 508 of wire 506 each have a larger diameter than the second channel 104, when the wires 502 and 506 are in the second channel 104, wires 502 and 506 would each be prevented from sliding entirely through the second channel 104 and behind the desk/surface 500.

Although FIGS. 5A-5C depict the apparatus 100 in a particular orientation affixed to the top surface of a piece of furniture, the apparatus 100 may be rotated into any orientation and affixed to a surface, while maintaining its functionality. For example, the apparatus 100 can be rotated 90 or 180 degrees from its orientation in FIGS. 5A-5C and maintain its dual functionality.

Furthermore, although the foregoing examples refer to apparatus 100 from FIGS. 1A-1F, the apparatus 200 in FIGS. 2A-2E and the apparatus 300 in FIG. 3 would operate in conjunction with a wire or cord in a similar manner.

What is claimed:

1. An apparatus for retaining wire or cable comprising:
a first channel formed between a first surface and a second surface opposing said first surface, wherein at least one of said first surface and said second surface is configured to be movable towards the opposing surface to grip a wire when said wire is positioned between the first and second surfaces,
a second channel adjacent to and comprising a larger clearance area than said first channel, wherein said second channel is configured to allow said wire to move freely and remain captivated within said second channel when said wire is positioned in said second channel, and
an exterior shell and an interior component,
wherein said exterior shell comprises an arm extending from a body, and said body comprises a cavity configured to receive said interior component, and
wherein said interior component comprises a base, an actuating element, and a spring positioned between said actuating element and said base of the interior component configured to bias said actuating element away from said base of the interior component, wherein the arm comprises the first surface and the actuating element comprises the second surface, and the first and second channels are in between the arm and the interior component.

2. The apparatus of claim 1, wherein said first channel and said second channel are each configured to allow said wire to enter or exit the respective channel when said wire is moved laterally.

3. The apparatus of claim 2, wherein said first channel is configured to prevent movement of a wire through said first channel, and said second channel is configured to allow movement of said wire through said second channel and prevent removal of said wire through said second channel if said wire has a terminating connector.

4. The apparatus of claim 1, further comprising a mounting base configured to be affixed to a supporting surface.

5. The apparatus of claim 4, wherein the mounting base comprises means for removably affixing the apparatus to the supporting surface.

6. The apparatus of claim 1, wherein said actuating element comprises said slot, which is formed between two retaining members, and wherein said first channel is formed in an area between said slot and said surface, which is an adjacent surface of said arm.

7. The apparatus of claim 6, wherein said spring is configured to bias said actuating element towards said adjacent surface of said arm.

8. The apparatus of claim 7, wherein said first channel is configured to be opened by moving said actuating element away from said adjacent surface of said arm, either manually or by moving said wire laterally.

9. The apparatus of claim 1, wherein said body and said arm are at least partially separated by a slit, and said first channel and said second channel are contained in said slit.

10. The apparatus of claim 1, further comprising a spring separate and external to the internal component configured to exert a force on the first surface or the second surface of the first channel.

11. The apparatus of claim 1, wherein said second channel is configured with a constant clearance area allowing said wire to move freely and remain captivated within said second channel when said wire is positioned in said second channel.

12. A system for retaining wire comprising:
a wire comprising a terminating end connector, and
an apparatus comprising:
a first channel formed between a first surface and a second surface opposing said first surface, wherein at least one of said first surface and said second surface is configured to be movable towards the opposing surface to grip said wire when said wire is positioned between the first and second surfaces, and
a second channel adjacent to and comprising a larger clearance area than said first channel, wherein said second channel is configured to allow said wire to move freely and remain captivated within said second channel when said wire is positioned in said second channel,
an exterior shell and an interior component,
wherein said exterior shell comprises an arm extending from a body, and said body comprises a cavity configured to receive said interior component, and
wherein said interior component comprises a base, an actuating element, and a spring positioned between said actuating element and said base of the interior component configured to bias said actuating element away from said base of the interior component, wherein the arm comprises the first surface and the actuating element comprises the second surface, and the first and second channels are in between the arm and the interior component.

13. The system of claim 12, wherein said first channel and said second channel are each configured to allow said wire to enter or exit the respective channel when said wire is moved laterally.

14. The system of claim 13, wherein said apparatus further comprising a mounting base configured to be affixed to a supporting surface.

15. The system of claim 12, wherein said body and said arm are at least partially separated by a slit, and said first channel and said second channel are contained in a space of said apparatus vacated by said slit.

* * * * *